United States Patent
Shen et al.

(10) Patent No.: US 9,983,811 B2
(45) Date of Patent: May 29, 2018

(54) SAVE CRITICAL DATA UPON POWER LOSS

(71) Applicant: SEAGATE TECHNOLOGY LLC, Cupertino, CA (US)

(72) Inventors: Jin Quan Shen, Singapore (SG); Yong Peng Chng, Singapore (SG); Thein Than Zaw, Singapore (SG); Robertus Hartono, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 62 days.

(21) Appl. No.: 15/164,732

(22) Filed: May 25, 2016

(65) Prior Publication Data

US 2017/0344279 A1 Nov. 30, 2017

(51) Int. Cl.
*G06F 12/00* (2006.01)
*G06F 3/06* (2006.01)

(52) U.S. Cl.
CPC .......... *G06F 3/0619* (2013.01); *G06F 3/0653* (2013.01); *G06F 3/0685* (2013.01)

(58) Field of Classification Search
CPC ..... G06F 3/0619; G06F 3/0653; G06F 3/0685
See application file for complete search history.

(56) References Cited

U.S. PATENT DOCUMENTS

| | | | |
|---|---|---|---|
| 7,647,474 B2 | 1/2010 | Bulusu et al. | |
| 8,892,817 B2 | 11/2014 | Bandic et al. | |
| 2005/0198432 A1* | 9/2005 | Lo | G06F 1/30 711/112 |
| 2006/0141710 A1* | 6/2006 | Yoon | H01L 27/115 438/261 |
| 2010/0095148 A1* | 4/2010 | Cheng | G06F 11/1068 714/6.13 |
| 2012/0221891 A1 | 8/2012 | Shimizu | |
| 2012/0303867 A1* | 11/2012 | Hall | G11B 5/012 711/103 |

* cited by examiner

*Primary Examiner* — Kalpit Parikh
(74) *Attorney, Agent, or Firm* — Holland & Hart LLP (57) ABSTRACT

Systems and methods for saving critical data upon power loss are described. In one embodiment, the systems and methods include performing a write operation to a first track of a storage drive, monitoring a voltage level of a storage drive to detect power loss on the storage drive while performing the write operation, identifying a track ID of a second track adjacent to the first track upon detecting power loss on the storage drive, and storing the identified track ID in a non-volatile memory on the storage drive.

19 Claims, 8 Drawing Sheets

SAVE CRITICAL DATA UPON POWER LOSS

SUMMARY

The present disclosure is directed to methods and systems for saving critical data upon power loss. In some embodiments, the present systems and methods may detect a power loss event and upon detecting the power loss event save a predetermined amount of critical data to non-volatile memory on a storage device.

A storage device for saving critical data upon power loss is described. In one embodiment, the storage device may include a storage drive and a storage controller configured to perform the steps of performing a write operation to a first track of the storage drive, monitoring a voltage level of a storage drive to detect power loss on the storage drive while performing the write operation, identifying a track ID of a second track adjacent to the first track upon detecting power loss on the storage drive, and storing the identified track ID in a non-volatile memory on the storage drive.

In some embodiments, at least a portion of the storage drive may be configured for shingled magnetic recording (SMR). Accordingly, in some embodiments, the write operation may include writing data to one or more SMR tracks. In some embodiments, at least a portion of the monitoring may be performed in conjunction with a system on chip (SoC) on the storage drive configured to monitor one or more aspects of the storage drive.

In some embodiments, the storage controller may be configured to store the identified track ID in a non-volatile memory on the storage drive. In some configurations, the storage controller may be configured to verify the first track after power is restored. In some embodiments, the storage controller may be configured to read the track ID of the second track stored in the non-volatile memory after power is restored and bypass verifying the second track based on the track ID of the second track being stored in the non-volatile memory.

In some embodiments, the storage controller may be configured to mark the second track as an unusable track based on the track ID of the second track being stored in the non-volatile memory. In some configurations, the storage controller may be configured to detect when the voltage level of the storage drive drops below a predetermined voltage level. In some embodiments, the storage controller may be configured to detect when power is restored to the storage drive after the power loss.

In some embodiments, the system may include a capacitor to provide a time period after the storage drive loses power for the storage controller to store the track ID of the second drive. In some embodiments, the capacitor may receive a supply voltage before loss of power. The capacitor may store a measure of charge at supply voltage. Upon power loss, the capacitor may supply the measure of charge at the supply voltage to enable the system to store the track ID to the non-volatile memory.

In some embodiments, the storage controller may be configured to store the identified track ID in a table of track IDs. In some embodiments, the storage controller may store one or more track IDs to the non-volatile memory. Upon power being restored, the storage controller may read the track IDs stored to the non-volatile memory and build table of track IDs from the track IDs that are read from the non-volatile memory. In some cases, the non-volatile memory may include a NOR flash memory.

An apparatus for saving critical data upon power loss is also described. In one embodiment, the apparatus may include a processor, memory in electronic communication with the processor, and instructions stored in the memory, the instructions being executable by the processor to perform the steps of performing a write operation to a first track of a storage drive, monitoring a voltage level of a storage drive to detect power loss on the storage drive while performing the write operation, identifying a track ID of a second track adjacent to the first track upon detecting power loss on the storage drive, and storing the identified track ID in a non-volatile memory on the storage drive A method for saving critical data upon power loss is also described. In one embodiment, the method may include performing a write operation to a first track of a storage drive, monitoring a voltage level of a storage drive to detect power loss on the storage drive while performing the write operation, identifying a track ID of a second track adjacent to the first track upon detecting power loss on the storage drive, and storing the identified track ID in a non-volatile memory on the storage drive.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The following relates generally to saving critical data upon power loss. In one embodiment, the present systems and methods detect power loss on a storage device and upon detecting power loss, store a predetermined amount of data in a non-volatile memory of the storage device.

A storage device may include a hard disk drive, a solid state drive, a hybrid drive with both a hard disk and solid state drive, or any combination thereof. Power loss can occur for a number of reasons including electrical company failure (e.g., blackouts, brownouts, etc.), electrical system failures (e.g., building or home electrical system failure, etc.), electrical component failures (e.g., failure of a component on a storage device), and so forth. In some cases, a storage device may include a hot-swappable cable such as a universal serial bus (USB) cable that allows the storage device to be disconnected powered on and/or connected to a host system either by wire or wirelessly. Accordingly, in some cases, power loss may occur as a result of a user disconnecting a hot-swappable storage device.

In some embodiments, power loss may occur while an operation is being performed on the storage device (e.g., read, write, erase, trim, or any combination thereof.). In some cases, drive failure may occur when power is lost while a storage drive is performing an operation. For example, when power loss occurs as a storage drive is performing a write operation, the storage drive may time out due to the storage drive attempting to verify, after power is restored, data corrupted on a track adjacent to the track being written to in the write operation. Once power is restored, the storage drive may verify data written to tracks. The storage device may be unable to verify the corrupted data on the adjacent track. For instance, a storage drive may implement shingled magnetic recording (SMR) in some embodiments, where tracks are configured to overlap adjacent tracks. Additionally, or alternatively, the storage drive may include flash memory, a hybrid drive of hard disk drive media and flash memory, helium filled hard drives, heat assisted magnetic recording (HAMR), two dimensional magnetic recording (TDMR), multi sensor magnetic recording (MSMR) drives, and any combination thereof.

When an SMR storage device is performing a write operation, writing data onto a track in a band of tracks, an adjacent track in the band may be erased or corrupted as the track is being written. If power loss occurs while the write is processing, at least a portion or a sector, or possibly the entire adjacent track may become unreadable resulting in an unreadable disk error (UDE). After power is restored, the storage device may attempt to read data from the adjacent track. The storage device may attempt to read data sector by sector in the adjacent track. In some cases, the storage device may perform a sector by sector retry to recover the data. In some cases, the retry may take several minutes resulting in system timeout. In some cases, the storage drive may fail due to a system timeout.

Currently, when power loss occurs on a current storage device, power on the storage device drops too quickly for a storage controller to execute firmware to write critical information to a non-volatile memory of the storage device. Examples of critical information include data associated with a track that is corrupted during a write operation such as a track ID. However, the present systems and methods save critical information upon detecting power loss by implementing hardware, firmware, and/or software to save the critical information before power is entirely lost.

In one embodiment, the track ID of the adjacent track may be stored in a non-volatile memory on the storage device upon detecting power loss. For example, a SMR drive may include a non-volatile memory device for storing certain data once power is lost. As one example, the critical ID may be stored in a NOR-flash memory device. In some cases, the NOR-flash memory device may be dedicated to storing critical data upon power loss. The critical information may be stored upon power loss in order to enable storage drive recovery when power is restored.

In some embodiments, the present systems and methods may implement a capacitor in relation to a voltage level provided by the storage device (e.g., 5V, 3.3V, 1.8V, or any combination thereof.). Accordingly, a slew rate of voltage drop may be reduced upon power loss. In some embodiments, the present systems and methods may implement a capacitor with a capacitance rating of anywhere from 0.1 to 100 µF. In some cases, the capacitor may be connected to a printed circuit board of the storage device. The capacitor may be connected to a non-volatile memory and storage controller of the storage device. As indicated above, the capacitor may store an electric charge in relation to an applied voltage. The capacitor may store the electric charge at the provided voltage level for a certain period of time after power to the storage device is lost. Accordingly, the capacitor may provide its stored electric charge to the storage controller for a sufficient time to enable the storage controller to store critical data upon detecting the power loss event.

In some embodiments, the storage device may implement a system on chip (SoC). The SoC may be configured to detect a power loss event. As one example, the storage device may include a 5V power domain. The SoC may be configured to detect when the 5V power domain drops to a certain level or percentage of the 5V power. For example, the SoC may detect when 5V power drops to anywhere from 4.9V or less. In some cases, the SoC may generate an event interrupt upon detecting power loss. In one embodiment, the interrupt may be generated and sent to a storage controller. In some cases, the storage controller may include a reduced instruction set computing (RISC) processor such as an Advanced RISC Machine (ARM) processor. In some embodiments, the interrupt generated may include an interrupt request (IRQ) sent to the storage controller. Alternatively, in some embodiments, the interrupt generated may include a low latency fast interrupt request (FIQ) sent to the storage controller.

Upon receiving an interrupt, the controller may determine whether the interrupt is for a power loss event. When the controller determines the interrupt is for a power loss event, the controller may determine whether a write operation is occurring at the time of the power loss. Upon determining a write operation is occurring, the controller may identify a track ID of a track adjacent to the track currently being written and store the identified track ID in a non-volatile memory of the storage device. In some cases, the controller may store up to 4 bytes of information to the non-volatile memory in less than 100 microseconds. In some cases, the controller may store the critical information in two or more locations. For example, the controller may store the critical information and a copy of the critical information in the non-volatile memory. In some cases, the controller may store a copy of the critical information to a second non-volatile memory. In some embodiments, the controller may send a copy of the critical information to a memory device external to the storage drive.

In one embodiment, the controller may monitor the non-volatile memory to determine the available storage capacity of the non-volatile memory. In some cases, the controller may erase at least a portion of the non-volatile memory device when the controller determines 90% or more of the non-volatile memory device is used. As one example, the controller may erase the oldest data in the non-volatile memory. Alternatively, the controller may erase data in the non-volatile memory based on data type, data heat, or any combination thereof. In some embodiments, the controller may erase the portion of the non-volatile memory device when the controller determines the storage device is idle.

In one embodiment, when power is restored, the critical information (e.g., erased track IDs) may be retrieved from the non-volatile memory. In some embodiments, the retrieved critical information may be configured to form a table. For example, one or more track IDs may be retrieved to form a table of track IDs. In some cases, a read/write (RW) subsystem may determine a track ID of a certain track is included in the table. Upon identifying the track ID of the certain track in the table, the RW subsystem may bypass attempting to read data from the certain track to prevent system timeout, which may result in storage device failure. In some cases, upon identifying the track ID of the certain track in the table, the RW subsystem may bypass a sector by sector read retry on the track. Accordingly, storage device failure due to device time out may be avoided and thus access to the storage device may be retained despite power being lost while the storage device was performing a write operation.

Figure 1:
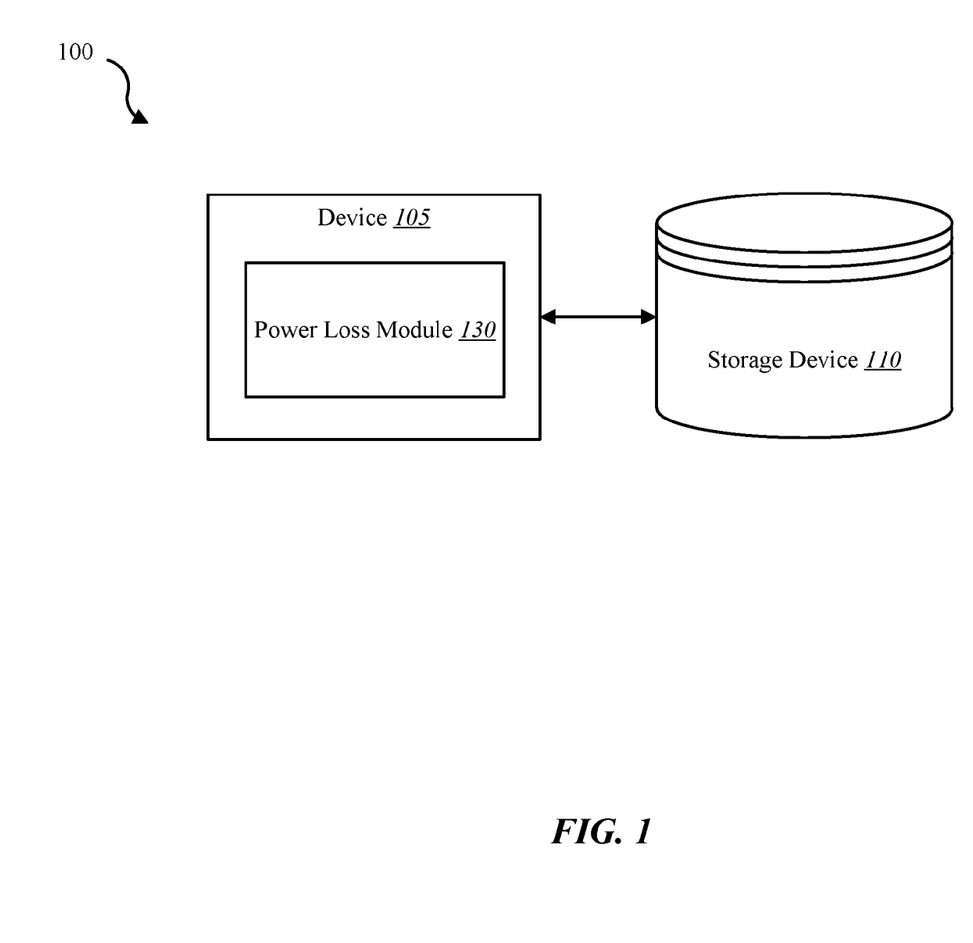
FIG. 1 is a block diagram of an example of a system in accordance with various embodiments.

FIG. 1 is a block diagram illustrating one embodiment of an environment 100 in which the present systems and methods may be implemented. The environment may include device 105 and storage device 110. The storage device 110 may include any combination of hard disk drives, solid state drives, and hybrid drives that include both hard disk and solid state drives. In some embodiments, the systems and methods described herein may be performed on a single device (e.g., device 105). In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include a power loss module 130. In one example, the device 105 may be coupled to storage device 110. In some embodiments, device 105 and storage device 110 may be components of flash memory or a solid state drive. Alternatively, device 105 may be a component of a host (e.g., operating system, host hardware system, or any combination thereof) of the storage device 110.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. For example, storage device 110 may include a database. Additionally, or alternatively, the database may include a connection to a wired and/or a wireless database. Additionally, as described in further detail herein, software and/or firmware (e.g., stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. Power loss module 130 may be configured to save critical data upon detecting power loss.

Figure 2:
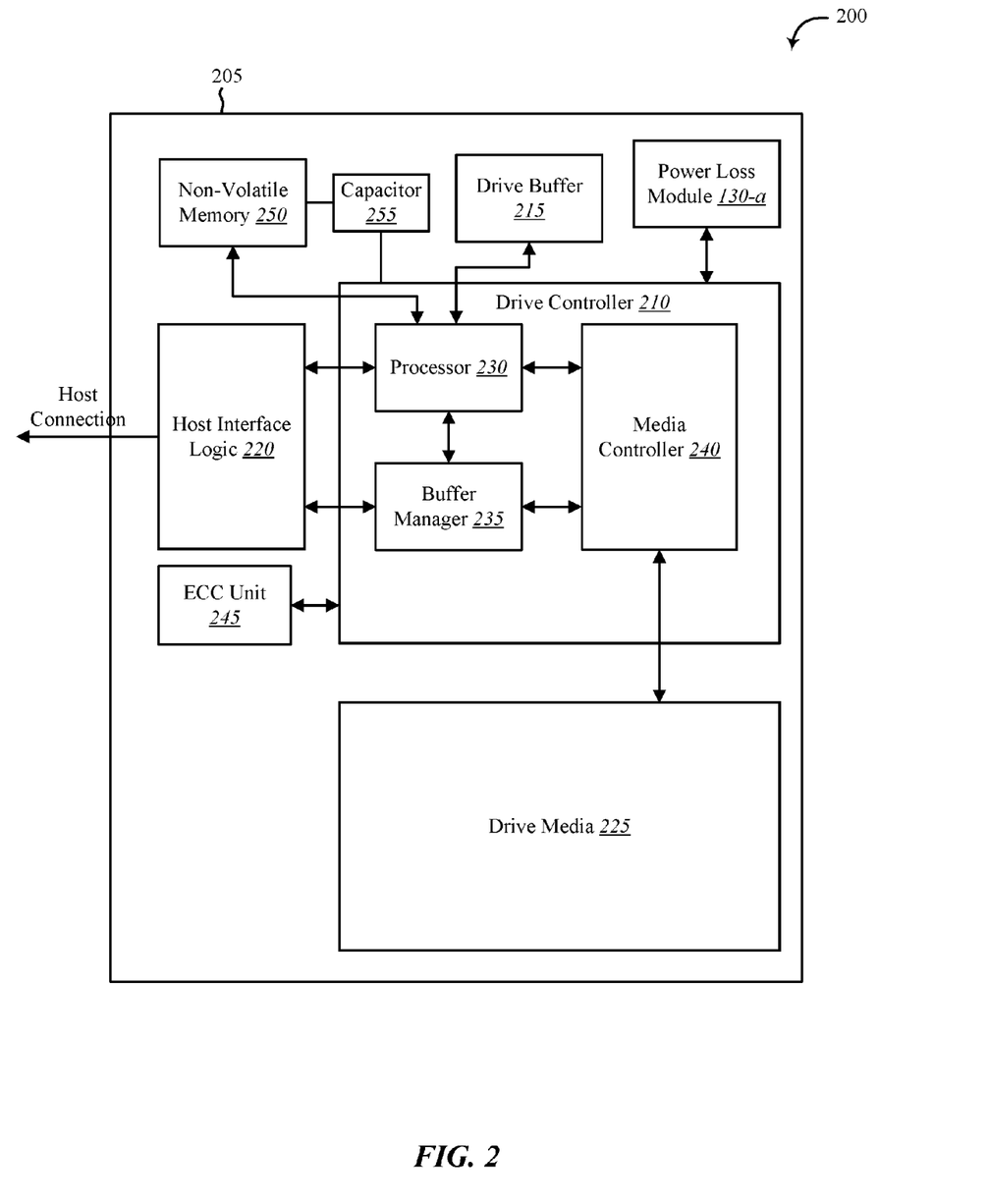
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive buffer 215, host interface logic 220, drive media 225, error correcting code (ECC) unit 245, non-volatile memory 250, capacitor 255, and power loss module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205 (e.g., an operating system, host hardware system, or any combination thereof). The drive buffer 215 may hold data temporarily for internal operations of apparatus 205. For example, a host may send data to apparatus 205 with a request to store the data on the drive media 225. The driver controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215.

Although depicted outside of drive controller 210, in some embodiments, power loss module 130-*a* may include software, firmware, and/or hardware located within drive controller 210. For example, power loss module 130-*a* may include at least portions of processor 230, buffer manager 235, and/or media controller 240. In one example, power loss module 130-*a* may include one or more instructions executed by processor 230, buffer manager 235, and/or media controller 240. The power loss module 130-*a* may be configured to store critical data in non-volatile memory 250. In some cases, power loss module 130-*a*, in connection with storage controller 210, may be configured to provide voltage, in conjunction with capacitor 255, to non-volatile memory 250 and/or controller 210 when power to apparatus 205 is lost. By this voltage, power loss module 130-*a* may enable drive controller 210 to save critical information to non-volatile memory 250 before power is completely gone.

Figure 3:
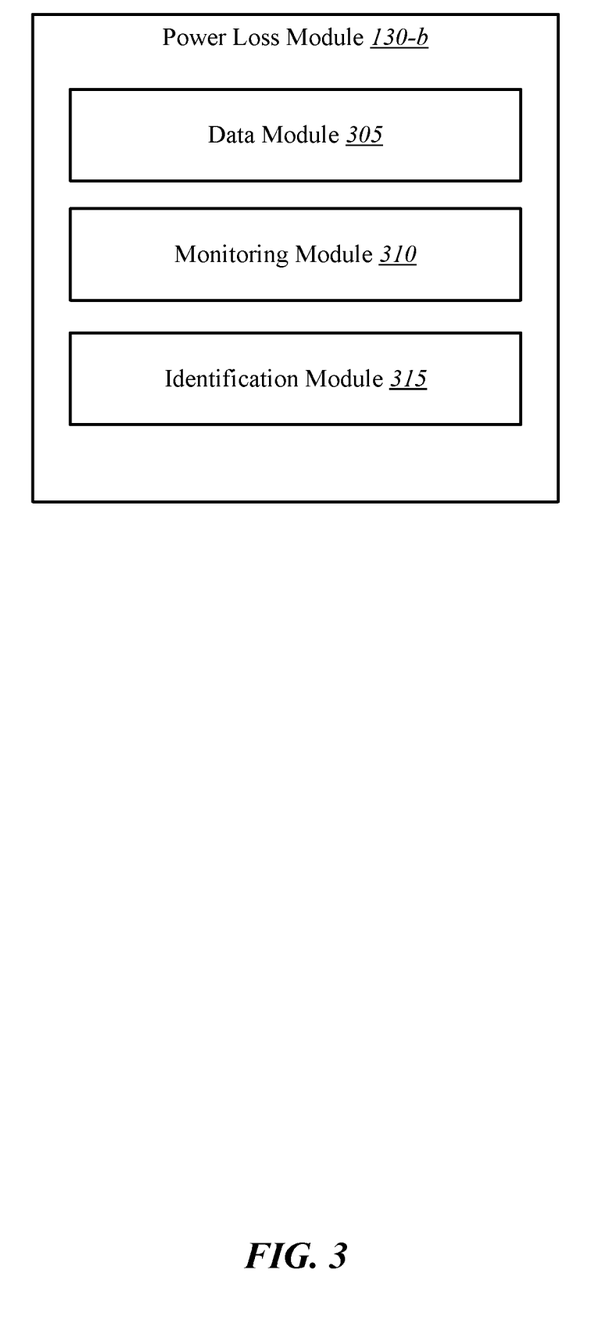
FIG. 3 shows a block diagram of one or more modules in accordance with various aspects of this disclosure.

FIG. 3 shows a power loss module 130-*b*. The power loss module 130-*b* may include one or more processors, memory, and/or one or more storage devices. The power loss module 130-*b* may include data module 305, monitoring module 310, and identification module 315. The power loss module 130-*b* may be one example of power loss module 130 of FIGS. 1 and/or 2. Each of these components may be in communication with each other.

In one embodiment, data module 305 may be configured to perform a write operation to a first track of a storage drive. For example, data module 305 may perform a write operation to write data to a track of a hard drive. In some cases, the storage drive may implement shingled magnetic recording (SMR) where data is written to a first track of a band of tracks on a disk of the storage drive and a second track of the band, adjacent to the first track, partially overlaps the first track when data is written to the second track of the band of tracks.

In some embodiments, a write operation may include updating data on one or more tracks. As a first track is being written to or overwritten, data on an adjacent second track may be corrupted by the write operation to the first track due to the magnetic read/write head interfering with the magnetic field of the partially overlapped second track as data is written to the first track. If power is lost before the second track is written, then the second track may be corrupted and unreadable, causing delays when power is restored to the storage drive. Thus, in some embodiments, monitoring module 310 may be configured to monitor a voltage level of a storage drive to detect power loss on or to the storage drive while performing the write operation. In some embodiments, at least a portion of the monitoring may be performed in conjunction with a system on chip (SoC) on the storage drive configured to monitor one or more aspects of the storage drive. Accordingly, data may be saved to the storage drive that indicates a second track adjacent to a first track being written when power was lost is likely corrupted, enabling the storage drive to determine the second track is corrupted once power is restored to the storage drive.

In some embodiments, identification module 315 may be configured to identify a track ID of a second track adjacent to the first track in relation to detecting power loss on the storage drive. In some embodiments, data module 305 may be configured to store the identified track ID in a non-volatile memory on the storage drive. In some cases, the non-volatile memory may include read only memory (ROM)-based flash memory such as NOR flash memory, NAND flash memory, etc., and/or non-volatile random access memory (RAM)-based flash memory such as non-volatile SRAM, ferroelectric RAM, magnetoresistive RAM, phase change RAM, nano-RAM, or any combination of the above. In some embodiments, data module 305 may store the track ID in a table of track IDs stored in the non-volatile memory.

In some embodiments, data module 305 may be configured to provide a time period after the storage drive loses power for the storage controller to store the track ID of the second drive. In some embodiments, data module 305 may provide a time period to write a track ID after the storage drive loses power in conjunction with a capacitor on the storage drive. For example, data module 305 may supply a supply voltage (e.g., 5V) to a capacitor on the storage drive that is connected to the non-volatile memory where the track ID is stored. Thus, upon monitoring module 310 detecting power loss, the capacitor may provide the non-volatile memory with the supply voltage for a certain time to enable the data module 305 to write the track ID of the second track to the non-volatile memory. In some embodiments, one or more capacitors may provide the supply voltage to the non-volatile memory and one or more electronic components of the storage drive to enable the data module 305 to write the track ID to the non-volatile memory.

In some embodiments, data module 305 may be configured to verify the first track after power is restored. In some cases, since the power loss occurred while writing to the first track, at least some of the first track may include stale or unreadable data. Thus, in some cases, based on the track ID stored by the data module 305 upon power loss, the identification module 315 may identify the valid data written to the first track during the write operation and data on the first track that was meant to be overwritten by the write operation.

In some embodiments, data module 305 may be configured to read the track ID of the second track stored in the non-volatile memory after power is restored. In some embodiments, data module 305 may be configured to bypass verifying the second track based on the track ID of the second track being stored in the non-volatile memory. For example, upon power being restored, data module 305 may be configured to verify the data stored in tracks of the storage drive. Before verifying at least the second track, data module 305 may access a table of track IDs stored in the non-volatile memory of the storage drive. Upon accessing the table, data module 305 may determine the track ID of the second track is stored in the table of track IDs. Based on the track ID of the second track being stored in the table of track IDs, data module 305 may determine that the data in the second track is corrupted, and therefore, may bypass verifying the second track.

In some embodiments, data module 305 may be configured to mark the second track as an unusable track based on the track ID of the second track being stored in the non-volatile memory. Data on a third track adjacent to the second track may remain uncorrupted. Accordingly, the data module 305 may perform a read operation in relation to the first, second, and third tracks. Upon performing the read operation, data module 305 may read data from the first track, skip the second track, and read data from the third track.

In some embodiments, the data written to the first track during the write operation affected by the power loss may be stored in a storage medium of the storage drive such as the non-volatile memory or another storage medium of the storage drive. For example, the data being written to the first track may be stored in a media cache of the storage device (e.g., a non-user-accessible portion of a hard disk allocated for temporarily storing data to be written to a user-accessible portion of the hard disk). Also, the data that was to be written to the second track if the power loss had not occurred may be stored in another location such as the media cache. Accordingly, the data written to the first track and data to have been written to the second track may be accessed from the storage medium and written to other tracks on the storage drive after power is restored. The first and second tracks may then be marked as stale and used for other data in another write operation.

In some embodiments, monitoring module 310 may be configured to detect when the voltage level of the storage drive drops below a predetermined voltage level. For example, the monitoring module 310 may determine when a supply voltage of the storage drive drops a predetermined percentage or predetermined amount of voltage from the supply voltage. As one example, the monitoring module 310 may detect when a supply voltage of the storage drive (e.g., 5V) drops to a certain value (e.g., 4.3V) or when a certain amount of voltage is lost on the supply voltage (e.g., 0.5V or more lost on 5V supply voltage). Alternatively, monitoring module 310 may detect when a supply voltage of the storage drive (e.g., 3.3 v) drops to a certain percentage of the supply voltage (e.g., 15% drop to 2.8V), and so forth. It is noted that the terms "voltage," "voltage level," "supply voltage," and "actual voltage" may be used interchangeably. Additionally, or alternatively, the monitoring module 310 may detect when a reverse biased voltage of the supply voltage detects a differential between the supply voltage and the actual voltage changes a given amount such as a 15% differential, a 0.7V differential, 0.5V differential, or any other appropriate predetermined differential. For example, the monitoring module 310 may detect when a differential between a supply voltage and actual voltage satisfies a differential threshold.

In some embodiments, monitoring module 310 may be configured to detect when power is restored to the storage drive after the power loss. For example, monitoring module 310 may determine when a supply voltage is detected and/or restored to the storage drive. In some cases, monitoring module 310 may determine when a supply voltage is at or above a certain value. As one example, monitoring module 310 may determine when a supply voltage of 5V is at or above 4.7V.

Figure 4:
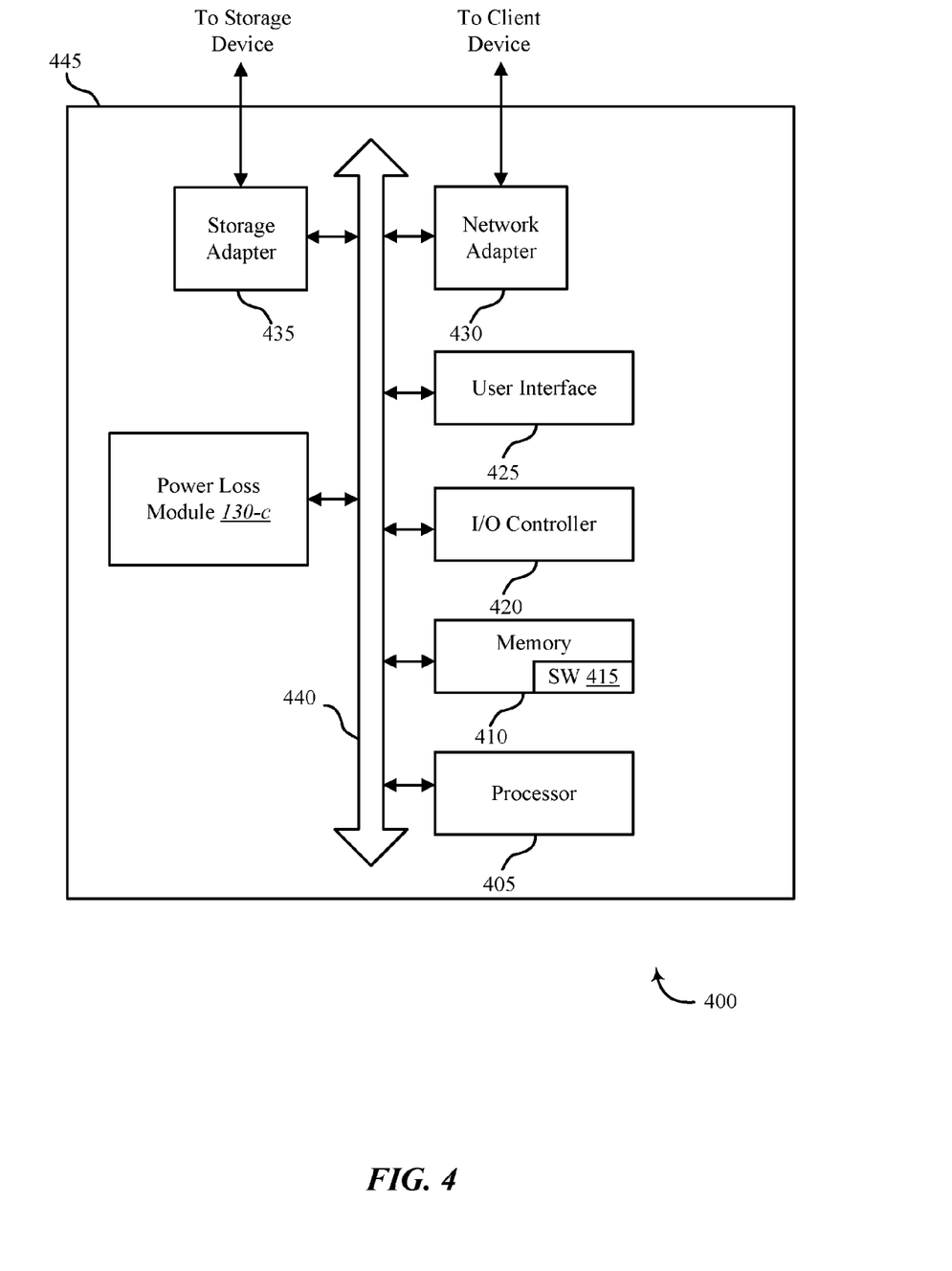
FIG. 4 shows a diagram of a system in accordance with various aspects of this disclosure.

FIG. 4 shows a system 400 for saving critical data upon power loss, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (e.g., apparatus 445 communicating directly with a storage system) and/or indirect (e.g., apparatus 445 communicating indirectly with a client device through a server).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally— via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a power loss module 130-c, which may perform the functions described above for the power loss module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 (e.g., processor module 405, memory 410, I/O controller module 420, user interface module 425, network adapter 430, and storage adapter 435, or any combination thereof).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405, but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), or any combination thereof.

In some embodiments, the memory 410 may contain, among other things, the Basic Input-Output system (BIOS) which may control basic hardware and/or software operation such as the interaction with peripheral components or devices. For example, at least a portion of the power loss module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 430, etc.).

Many other devices and/or subsystems may be connected to one or may be included as one or more elements of system 400 (e.g., personal computing device, mobile computing device, smart phone, server, internet-connected device, cell radio module, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices (e.g., device 105 of FIG. 1), and/or other devices over a network. Network adapter 430 may provide wired and/or wireless network connections. In some cases, network adapter 430 may include an Ethernet adapter or Fibre Channel adapter. Storage adapter 435 may enable apparatus 445 to access one or more data storage devices (e.g., storage device 110). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
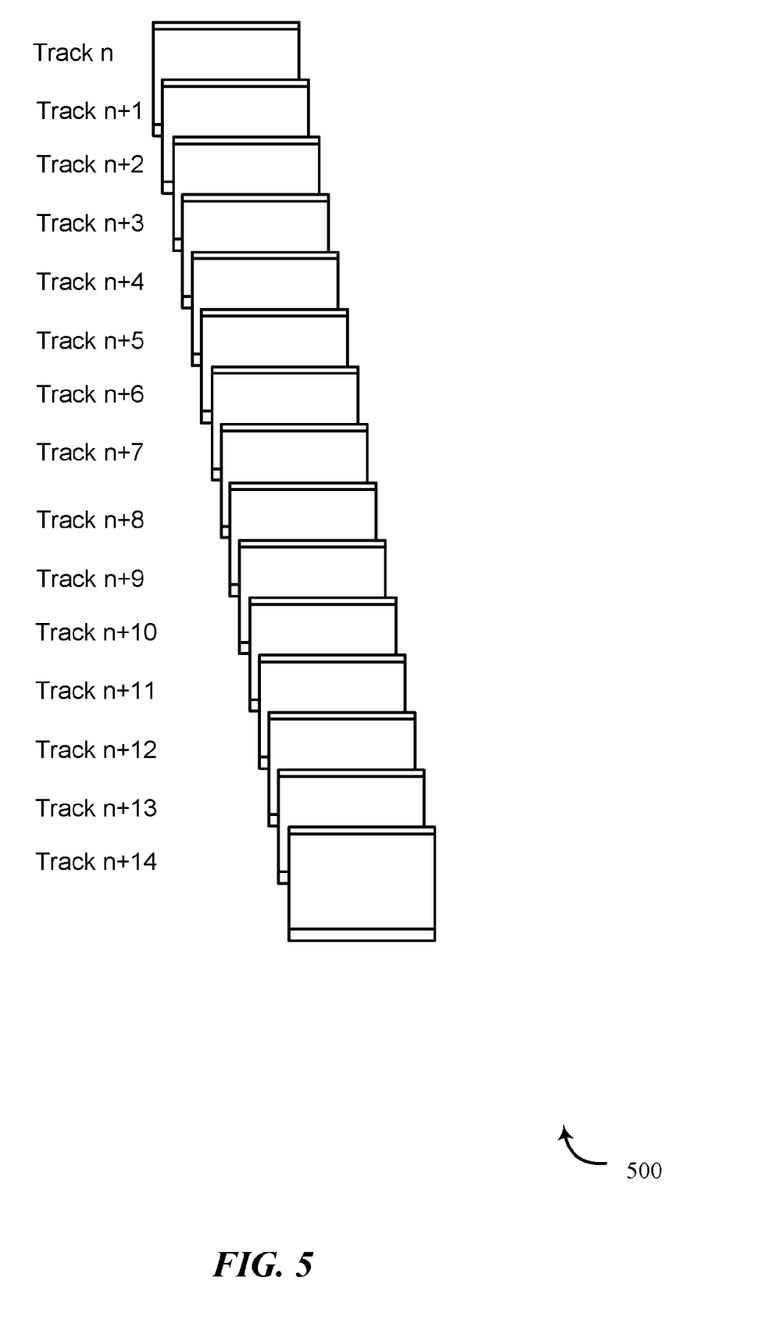
FIG. 5 shows one embodiment of an environment in accordance with various aspects of this disclosure.

FIG. 5 shows an environment 500 for saving critical data upon power loss, in accordance with various examples. At least one aspect of environment 500 may be implemented in conjunction with device 105 of FIG. 1, apparatus 205 of FIG. 2, and/or power loss module 130 depicted in FIGS. 1, 2, 3, and/or 4.

As depicted, environment 500 depicts one embodiment of data tracks from a shingled media partition (e.g., shingled media partition of drive media 225 from FIG. 2), where track n+1 is shingled over track n, track n+2 over track n+1, and so forth. In one embodiment, the environment 500 depicts one embodiment of a proposed track layout of an SMR drive. As depicted, tracks n through n+14 are data tracks of a storage device that implements SMR on at least a portion of a disk of the storage device.

Although environment 500 depicts 15 shingled tracks, from track n to track n+14. In one embodiment, tracks n to n+14 represent a portion of a total number of tracks on a shingled media partition. In some embodiments, tracks n to n+14 represent the total number of tracks of a shingled media partition. For example, a shingled media partition may include 50,000 tracks. Thus, in some embodiments, tracks n to n+14 are a representation of the total number of tracks in a shingled media partition, whether the total number of tracks numbers in the tens, hundreds, or thousands, etc.

In one embodiment, environment 500 may depict one example of a new, formatted, or trimmed SMR drive prior to any data being written to the tracks. Alternatively, environment 500 may depict an SMR drive with all of the tracks containing data, where tracks n to n+14 represent a total set of tracks in a shingled media partition. In some embodiments, tracks n to n+14 may represent shingled tracks from a portion of the total number of tracks in a shingled media partition. Thus, tracks n to n+14 may represent data written to all the tracks of this portion of the total number of tracks in the shingled media partition.

The value "n" from environment 500 (e.g., track "n") may be any non-negative integer from 0 to a value representing a final track within a shingled media partition. For example, if there are 256 tracks in a shingled media partition, then "n" may be any value between 0 and 255. It is noted that if "n" were set to 255 for tracks 0 to 255, then the depicted tracks following track n would not exist, as track n would be the last track. Thus, if ten tracks are selected among 256 total tracks, then "n" would be any value between 0 and 246. If "n" were 246 and ten tracks were selected, then track n to track n+9 would be selected, where n=246 would be the first track of the ten selected tracks and n+9=255 would be the final track selected of the ten selected tracks, as well as the final track among the 256 total tracks.

Figure 6:
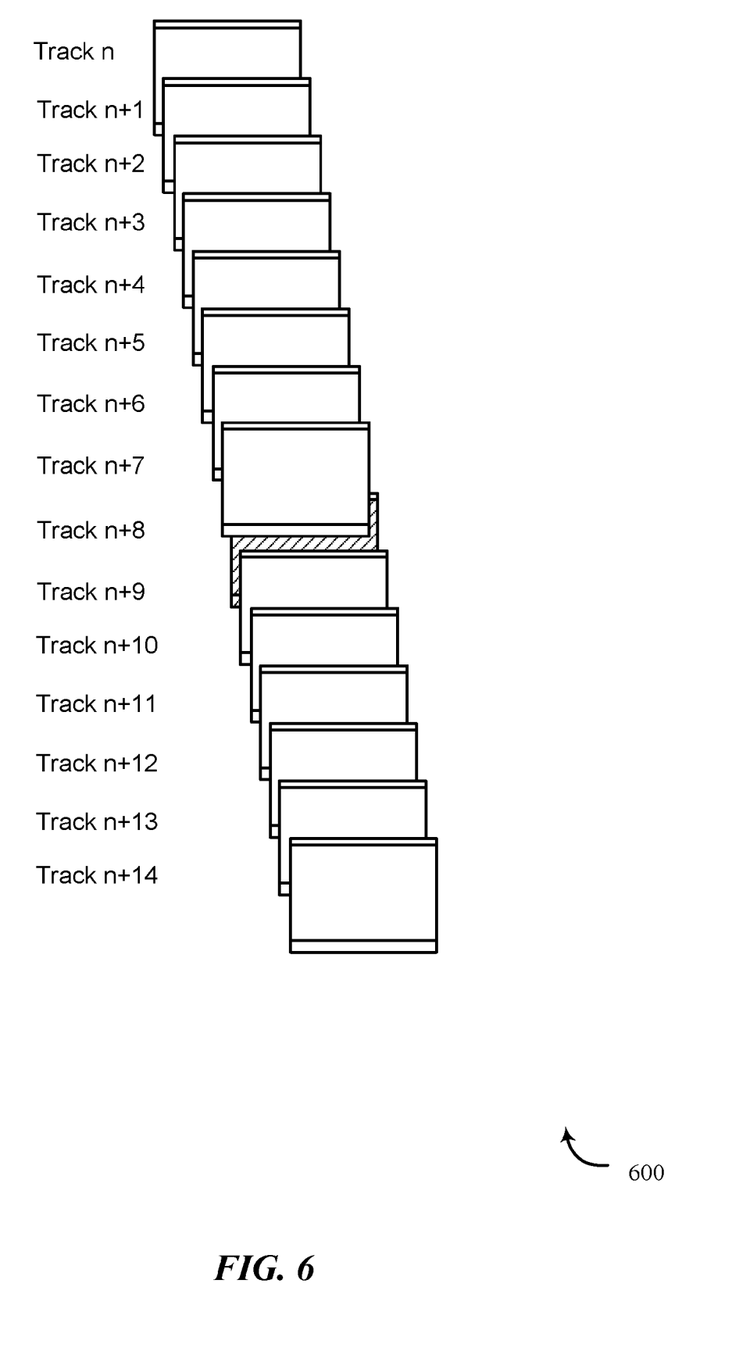
FIG. 6 shows another embodiment of an environment in accordance with various aspects of this disclosure.

FIG. 6 shows an environment 600 for saving critical data upon power loss, in accordance with various examples. Environment 600 may be one example of environment 500 of FIG. 5. At least one aspect of environment 600 may be implemented in conjunction with device 105 of FIG. 1, apparatus 205 of FIG. 2, and/or power loss module 130 depicted in FIGS. 1, 2, 3, and/or 4.

As depicted, environment 600 depicts one embodiment of data tracks from a shingled media partition, where track n+1 is shingled over track n, track n+2 over track n+1, and so forth. In one embodiment, the environment 600 depicts one embodiment of a proposed track layout of an SMR drive. Environment 600 may be an example of environment 500. As depicted, tracks n through n+14 are data tracks of a storage device that implements SMR on at least a portion of a disk of the storage device.

In one embodiment, power loss module 130 may perform a write operation that involves at least one track from environment 600. As one example, power loss module 130 may perform a write operation to track n+7. As a result of power loss module 130 writing data to track n+7, data on track n+8 may be corrupted and/or erased. In one embodiment, power may be lost while power loss module 130 writes data to track n+7. As the read/write head writes data to track n+7 the magnetic field of the read/write head may affect the magnetic field of track n+8. Since track n+7 overlaps track n+8, the read/write head may corrupt data on track n+8. Accordingly, data on track n+8 may be corrupted beyond recovery. Thus, FIG. 6 illustrates that track n+8 may be unreadable by the storage device and/or the data of track n+8 is logically inaccessible to a host of the storage device due to the physical corruption of the magnetic field of track n+8 that represented the data stored on track n+8.

In one embodiment, power loss module 130 may detect the power loss. Upon detecting power loss, power loss module 130 may identify and store the track ID for track n+8 in a non-volatile memory of the SMR drive (e.g., non-volatile memory 250 of FIG. 2). Accordingly, when power is restored to the SMR drive, power loss module 130 may identify the track ID for track n+8 stored in the non-volatile memory and skip performing a verification of track n+8. In some embodiments, power loss module 130 may skip performing a sector by sector retry for track n+8 based on identifying the track ID for track n+8. Otherwise, the SMR drive may spend a significant amount of time verifying the corrupted track n+8, causing a device timeout which may result in the drive failing. Accordingly, power loss module 130 may store the track ID of corrupted tracks in order to prevent device timeouts thereby avoiding drive failures and recovering the drive.

In one embodiment, a band may include a group of tracks on an SMR drive. In some embodiments, at least two operations involve reading media on an SMR drive, namely, band rewrite operations (e.g., read modify write operation of a band of tracks) and host read operations. In one embodiment, when a track read occurs in relation to a band rewrite operation, the affected track (e.g., track n+8) may be skipped. If the track read occurs in relation to a host read operation, a conventional drive may return an unrecoverable data error (UDE) status to the host. Alternatively, power loss module 130 may return a predefined data pattern to the host instead of UDE status when the host attempts to read an affected track such as track n+8. For example, power loss module 130 may detect that the track ID for track n+8 is stored in the non-volatile memory. As a result, when the host attempts to read data from track n+8, power loss module 130 may return a predefined pattern such as a string of zeroes and/or ones, as one example.

Figure 7:
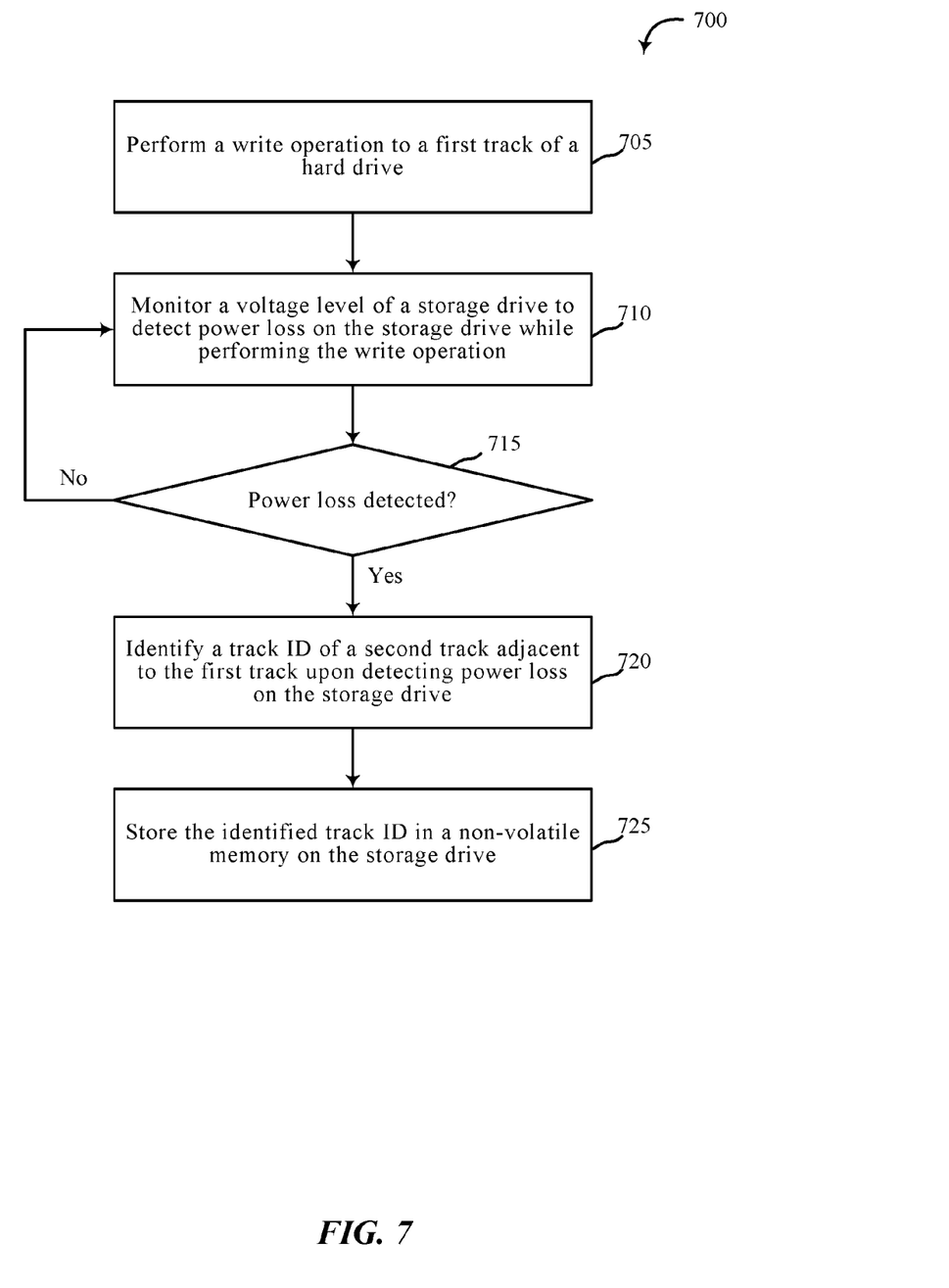
FIG. 7 is a flow chart illustrating an example of a method in accordance with various aspects of this disclosure.

FIG. 7 is a flow chart illustrating an example of a method 700 for saving critical data upon power loss, in accordance with various aspects of the present disclosure. One or more aspects of the method 700 may be implemented in conjunction with device 105 of FIG. 1, apparatus 205 of FIG. 2, and/or power loss module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, the method 700 may include performing a write operation to a first track of a hard drive. At block 710, the method 700 may include monitoring a voltage level of a storage drive to detect power loss on the storage drive while performing the write operation. At block 715, the method 700 may determine whether a power loss is detected. When power loss is not detected, the method 700 may continue to monitor the voltage level at block 710. When power loss is detected, at block 720, the method 700 may include identifying a track ID of a second track adjacent to the first track upon detecting power loss on the storage drive. At block 725, the method 700 may include storing the identified track ID in a non-volatile memory on the storage drive.

The operations at blocks 705-725 may be performed using the power loss module 130 described with reference to FIGS. 1-4 and/or another module. Thus, the method 700 may provide for saving critical data upon power loss relating to saving critical data upon power loss. It should be noted that the method 700 is just one implementation and that the operations of the method 700 may be rearranged, omitted, and/or otherwise modified such that other implementations are possible and contemplated.

Figure 8:
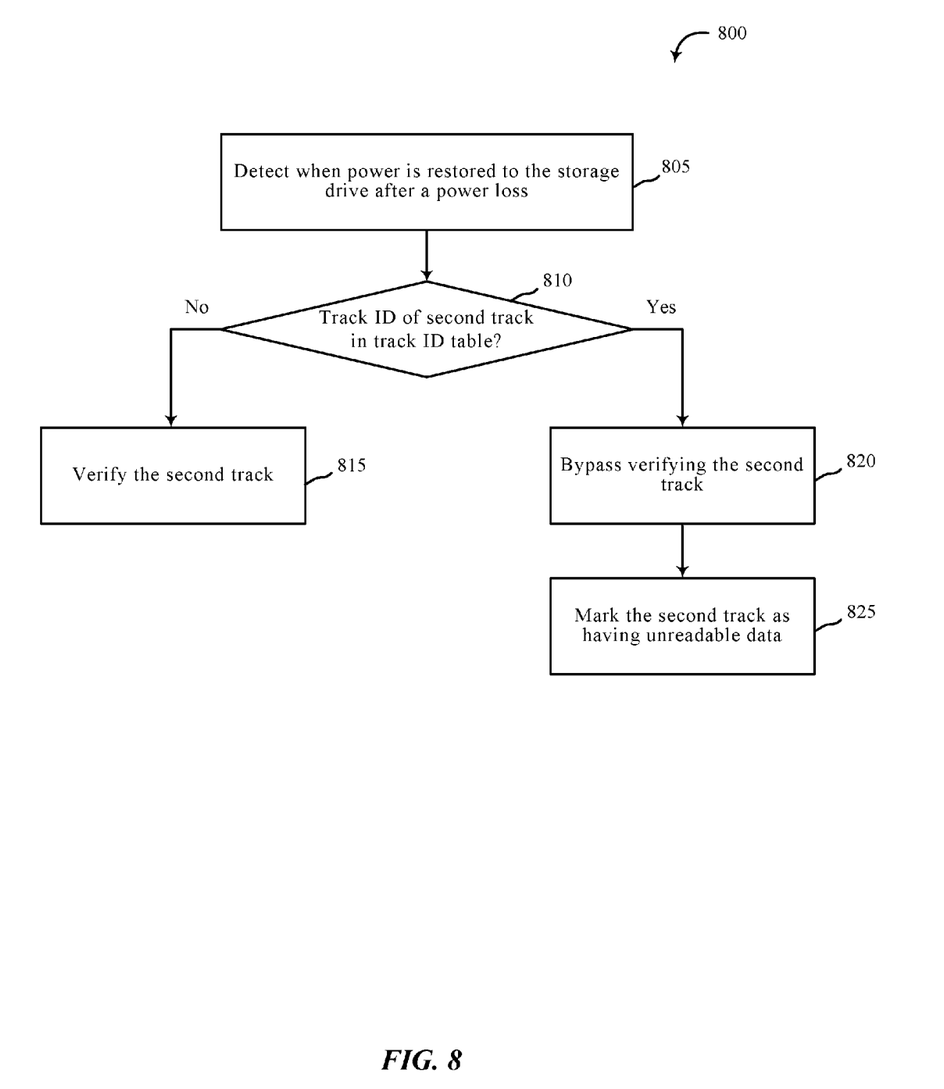
FIG. 8 is a flow chart illustrating an example of a method in accordance with various aspects of this disclosure.

FIG. 8 is a flow chart illustrating an example of a method 800 for saving critical data upon power loss, in accordance with various aspects of the present disclosure. One or more aspects of the method 800 may be implemented in conjunction with device 105 of FIG. 1, apparatus 205 of FIG. 2, and/or power loss module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 805, the method 800 may include detecting when power is restored to the storage drive after the power loss. When the power loss occurs, a write operation is writing data to a first track adjacent to a second track. At block 810, the method 800 may include determining whether the track ID of the second track is stored in a track ID table. If method 800 determines the track ID of the second track is not stored in the track table, at block 815 the method 800 may verify the second track. Otherwise, if method 800 determines the track ID of the second track is stored in the track table, at block 820 the method 800 may bypass verifying the second track based on the track ID of the second track being stored in the non-volatile memory. At block 825, the method 800 may mark the second track as having unreadable data.

The operation(s) at block 805-820 may be performed using the power loss module 130 described with reference to FIGS. 1-4 and/or another module. Thus, the method 800 may provide for saving critical data upon power loss. It should be noted that the method 800 is just one implementation and that the operations of the method 800 may be rearranged, omitted, and/or otherwise modified such that other implementations are possible and contemplated.

In some examples, aspects from two or more of the methods 700 and 800 may be combined and/or separated. It should be noted that the methods 700 and 800 are just example implementations, and that the operations of the methods 700 and 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A system comprising:
    a storage drive; and
    a storage controller to:
        perform a write operation to a first track of the storage drive;
        monitor a voltage level of a storage drive to detect power loss on the storage drive while performing the write operation;
        identify a track ID of a second track adjacent to the first track upon detecting power loss on the storage drive;
        store the identified track ID in a non-volatile memory on the storage drive; and
        bypass verifying the second track after power is restored based at least in part on the track ID of the second track being stored in the non-volatile memory.

2. The system of claim 1, the storage controller to:
    verify the first track after power is restored.

3. The system of claim 2, the storage controller to:
read the track ID of the second track stored in the non-volatile memory after power is restored.

4. The system of claim 1, the storage controller to:
mark the second track as an unusable track based on the track ID of the second track being stored in the non-volatile memory.

5. The system of claim 1, the storage controller to:
detect when the voltage level of the storage drive drops below a predetermined voltage level.

6. The system of claim 1, the storage controller to:
detect when power is restored to the storage drive after the power loss.

7. The system of claim 1, further comprising:
a capacitor to provide a time period after the storage drive loses power for the storage controller to store the track ID of the second drive.

8. The system of claim 1, the storage controller to:
store the identified track ID in a table of track IDs.

9. The system of claim 1, the non-volatile memory including a NOR flash memory.

10. The system of claim 1, at least a portion of the storage drive configured for shingled magnetic recording (SMR).

11. The system of claim 1, at least a portion of the monitoring being performed in conjunction with a system on chip (SoC) on the storage drive configured to monitor one or more aspects of the storage drive.

12. An apparatus comprising:
a controller to:
    perform a write operation to a first track of a storage drive;
    monitor a voltage level of a storage drive to detect power loss on the storage drive while performing the write operation;
    identify a track ID of a second track adjacent to the first track upon detecting power loss on the storage drive;
    store the identified track ID in a non-volatile memory on the storage drive; and
    bypass verifying the second track after power is restored based at least in part on the track ID of the second track being stored in the non-volatile memory.

13. The apparatus of claim 12, the storage controller to:
verify the first track after power is restored.

14. The apparatus of claim 12, the storage controller to:
read the track ID of the second track stored in the non-volatile memory after power is restored.

15. The apparatus of claim 12, the storage controller to:
mark the second track as an unusable track based on the track ID of the second track being stored in the non-volatile memory.

16. The apparatus of claim 12, the storage controller to:
detect when the voltage level of the storage drive drops below a predetermined voltage level.

17. The apparatus of claim 12, the storage controller to:
detect when power is restored to the storage drive after the power loss.

18. A method comprising:
performing a write operation to a first track of a storage drive;
monitoring a voltage level of a storage drive to detect power loss on the storage drive while performing the write operation;
identifying a track ID of a second track adjacent to the first track upon detecting power loss on the storage drive;
storing the identified track ID in a non-volatile memory on the storage drive; and
bypassing verifying the second track after power is restored based at least in part on the track ID of the second track being stored in the non-volatile memory.

19. The method of claim 18 comprising:
verifying the first track after power is restored;
reading the track ID of the second track stored in the non-volatile memory after power is restored.

* * * * *